Figure 1A:
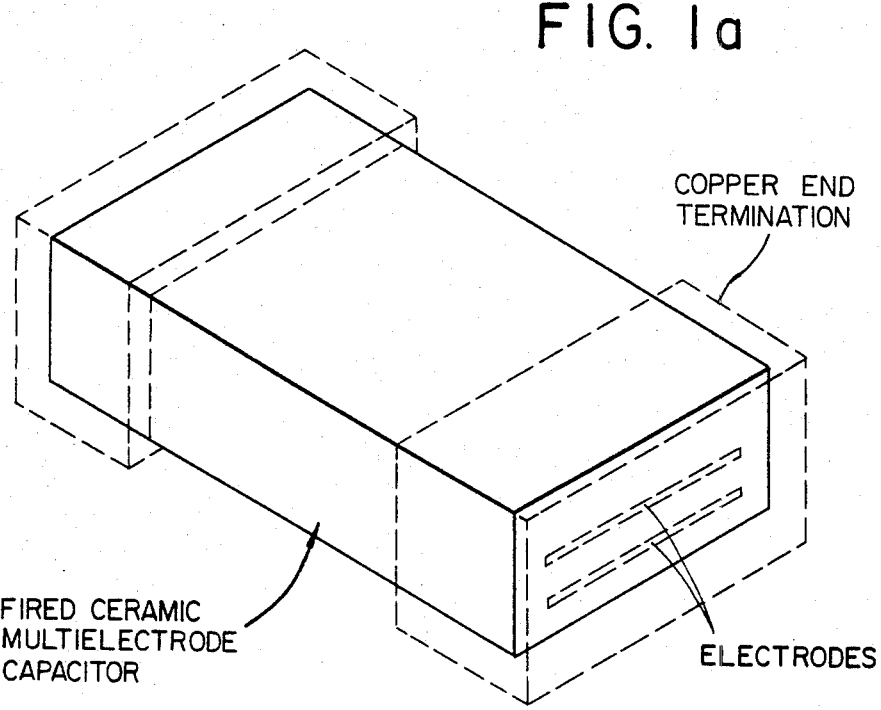

United States Patent [19]

Prakash et al.

[11] Patent Number: 4,517,155
[45] Date of Patent: May 14, 1985

[54] COPPER BASE METAL TERMINATION FOR MULTILAYER CERAMIC CAPACITORS

[75] Inventors: Sri Prakash, Simpsonville; William B. Snyder, Jr., Greenville, both of S.C.

[73] Assignee: Union Carbide Corporation, Danbury, Conn.

[21] Appl. No.: 606,608

[22] Filed: May 3, 1984

Related U.S. Application Data

[63] Continuation of Ser. No. 379,503, May 18, 1982, abandoned.

[51] Int. Cl.³ .............................................. B22F 7/00
[52] U.S. Cl. .................................... 419/19; 252/512; 419/10; 419/40
[58] Field of Search .................... 252/512; 419/10, 19, 419/40

[56] References Cited

U.S. PATENT DOCUMENTS

| | | |
|---|---|---|
| 2,389,420 | 11/1945 | Deyrup . |
| 3,350,341 | 10/1967 | Short . |
| 3,647,532 | 3/1972 | Friedman et al. ................. 252/512 |
| 4,064,310 | 12/1977 | Patterson ............................ 428/427 |
| 4,070,518 | 1/1978 | Hoffman ............................. 252/512 |
| 4,072,771 | 7/1978 | Grier ................................... 252/512 |
| 4,234,367 | 11/1980 | Herron et al. . |

Primary Examiner—Leland A. Sebastian
Attorney, Agent, or Firm—Frederick J. McCarthy, Jr.

[57] ABSTRACT

Copper end terminations of excellent electrical and mechanical properties are provided on multielectrode ceramic capacitors by applying copper, glass frit metallizations to the ends of a ceramic capacitor and firing the applied metallization in an atmosphere of nitrogen which contains a controlled partial pressure of oxygen.

5 Claims, 3 Drawing Figures

COPPER BASE METAL TERMINATION FOR MULTILAYER CERAMIC CAPACITORS

This application is a continuation of Ser. No. 379,503 filed May 18, 1982, now abandoned.

This invention relates to metallization paste materials and a process for producing a copper end metallization on a monolithic ceramic multilayer, i.e., multielectrode ceramic capacitor. Monolithic ceramic capacitors are well known in the prior art; the manufacture of a common type of multielectrode ceramic capacitor is described in U.S. Pat. No. 2,389,420. Ceramic capacitors, particularly those that are to have leads attached, or those that are soldered to hybrid microcircuits, must have an end metallization to which leads, or conductor pads, may be soldered. (Exceptions are capacitors that hava a compression type of lead attachment that does not require soldering such as glass encapsulated capacitor.) Prior art ceramic capacitor metallization pastes, as described by U.S. Pat. No. 3,350,341, commonly consist of a mixture of silver or other precious metal powder or flake, glass frit and an organic vehicle comprising organic binder and organic solvent. Manufacturing steps involve dipping the ends of fired, i.e., matured ceramic, multielectrode capacitor chips into the paste, drying the retained paste at a relatively low temperature, and thereafter firing, in air, at temperatures which will melt the glass, sinter the metal constituent of the paste, and provide a mechanical bond and electrical connection between the ceramic capacitor and metallization.

Although precious metal end metallizations have worked well for many years on monolithic, multielectrode ceramic capacitors, precious metals are expensive materials. Alternative base metal materials, for example nickel and copper, would be attractive from an economic standpoint. Prior art nickel-glass frit metallization pastes which can be fired in an oxidizing atmosphere have been described in U.S. Pat. Nos. 4,064,310 and 4,122,232. However, nickel metallizations prepared with this paste exhibit higher electrical resistivities and less than desired solderability. Copper, which has a higher conductivity and better solderability, would appear to be an excellent choice for a base metal-glass frit metallization paste. However, because of the high oxidation potential of copper, it has been assumed that such copper metallizations must be fired in a neutral or reducing atmosphere and that such an atmosphere would not ensure that chemical reduction of the oxides of the ceramic dielectric would not occur during firing of the metallization paste. That is to say, when firing copper-glass frit metallizations on chemically reducible ceramic dielectric materials, such as barium titanate, bismuth titanate or mixtures thereof, the problem is to prevent chemical reduction of the dielectric, including modifiers, while at the same time avoiding excessive oxidation of the copper.

The firing of commercial copper pastes as end metallizations on ceramic capacitors according to manufacturers' instructions, either in air or a commercially pure nitrogen atmosphere, has resulted in one or more of the following conditions: reduced insulation resistance of the capacitor dielectric, poor adhesion of the fired copper paste to the dielectric, loss of capacitance, shift in temperature coefficient of capacitance, blistered end metallizations and poor solderability.

It is accordingly an object of the present invention to provide a method for producing electrically and mechanically sound, high quality end terminations on multielectrode ceramic capacitors using a copper-glass frit metallization paste while at the same time avoiding reduction of the ceramic dielectric and degradation of electrical properties of the capacitor.

Figure 1B:
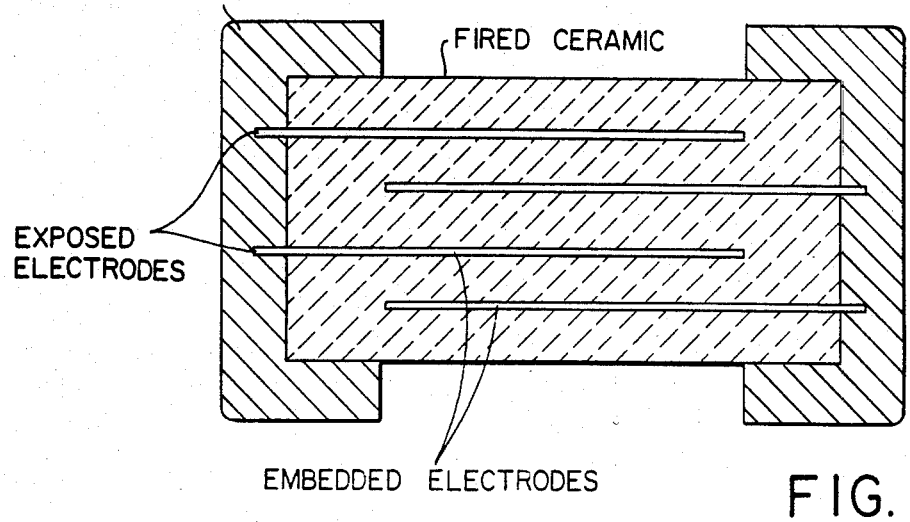
Figure 2:
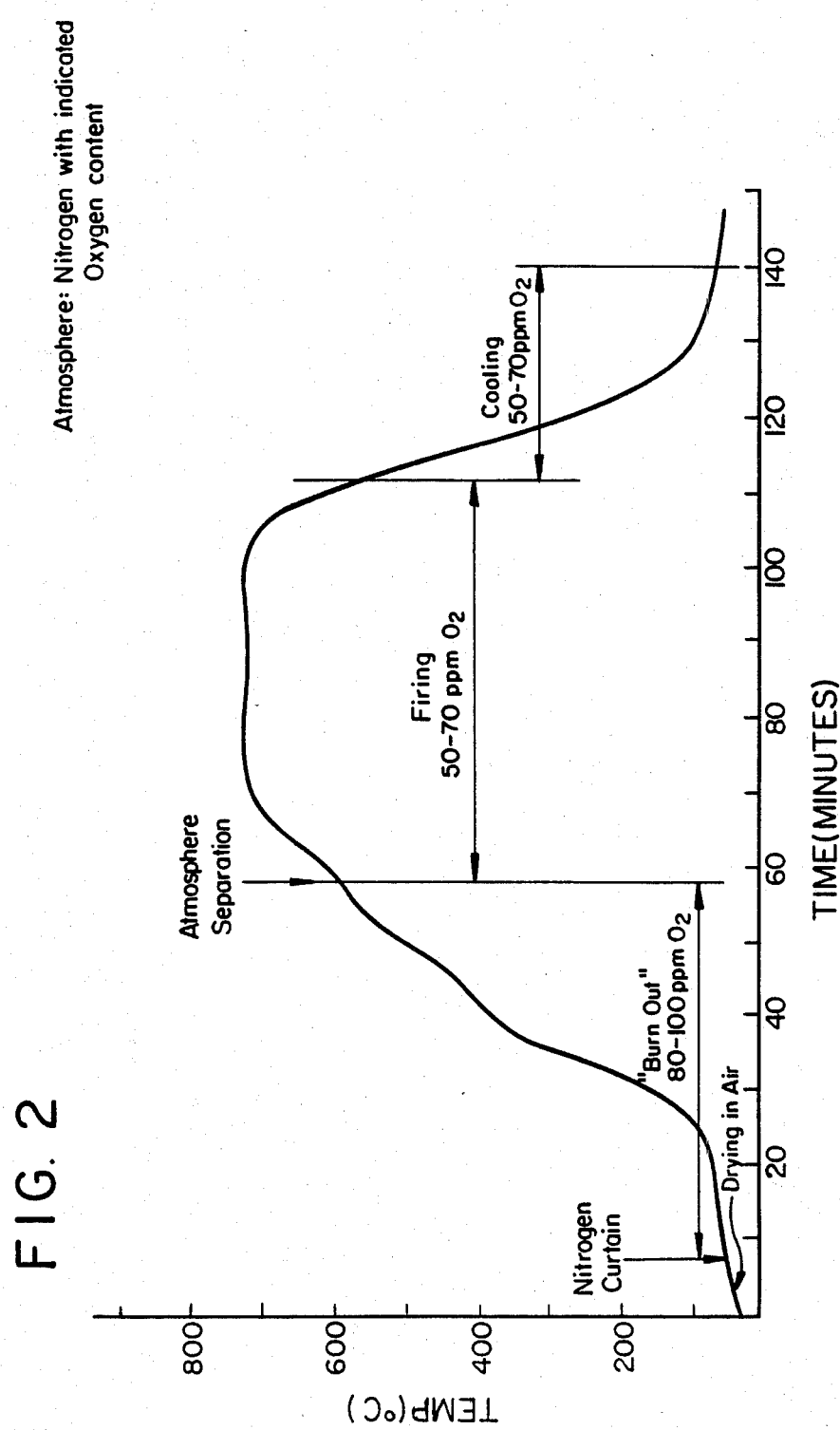

Other objects will be apparent from the following description and claims taken in conjunction with the drawing wherein FIGS. 1(a) and 1(b) show schematically a multielectrode ceramic capacitor with metallized end terminations and FIG. 2 shows a metallization heating profile in accordance with a particular embodiment of the present invention.

A method in accordance with the present invention comprises (i) providing a termination paste consisting essentially of about
  (a) 75 to 97%, preferably 91 to 94% by weight of solids in the paste being finely divided copper particles
  (b) 3 to 25%, preferably 6 to 9% by weight of solids in the paste being glass frit
  (c) a volatile and decomposable organic liquid vehicle suspending the solids (ii) applying the copper containing paste to an electrode exposed end portion of a matured ceramic, multielectrode capacitor body (iii) heating the copper containing paste-covered end portion of the ceramic capacitor body to a temperature in the range of 300° to 800° C. in a non-reactive gaseous environment containing a small amount of oxygen which is in excess of 20 ppm* and which is sufficient to prevent chemical reduction of said ceramic during said heating but insufficient to significantly oxidize said copper during said heating, the heating initially being at a lower temperature in said range for a period of time sufficient to remove substantially all organic binder and solvent constituents from the applied paste and thereafter being at a higher temperature in said range for a period of time sufficient to sinter the copper constituents of said applied paste and melt the glass constituent of said applied paste and bond the same to said ceramic capacitor body.

*The usage of parts per million (ppm) refers to a volume concentration of oxygen gas in a gas mixture at a pressure of 1 atmosphere. Thus the concentration in ppm is equivalent to the oxygen partial pressure, i.e., 20 ppm oxygen in equivalent to an oxygen partial pressure of $2 \times 10^{-5}$ atmospheres.

It has been discovered as part of the present invention that by careful control of exposure time and oxidation potential of the atmosphere during organic binder burn out and sintering, it is possible to produce a copper end metallization on a monolithic ceramic capacitor which is equal to or superior to precious metal terminations in adhesion strength, thermal shock resistance, and solder leach resistence without adversely affecting the electrical properties of the capacitor.

In the practice of the present invention, the making of the copper thick film termination paste comprises conventionally mixing copper powder and glass frit, and dispersing the mixture in an organic vehicle using the ranges shown in Table I.

TABLE I

|  | Range (Solids wt. %) |
| --- | --- |
| Copper Powder or Flake | 75–97 |
| Glass Frit | 3–25 |
| Organic Vehicle | Balance to Suspend |

TABLE I-continued

| | Range (Solids wt. %) |
|---|---|
| | Solids At Desired Viscosity |

The copper powders preferably have particle sizes of about 1 to 10 microns available from commercial sources, such as Grezes, Metz, Colonial and Cerac. Grezes, Colonial and Metz copper powder and flakes are manufactured by the precipitation technique; Cerac copper powder is spherical in shape and is manufactured by an atomizing technique. The oxide content in the powders and flakes varies from 0.3% to 0.8% by weight, and the surface area ranges from 0.5 m$^2$/g to 1.5 m$^2$/g. The particle size of the glass frits ranges from 1 to 10 microns. Glass frits are selected based on physical characteristics and their compositions. Sodium barium borosilicate and lead borosilicate are found to be more desirable bonding agents when blended together in a 3:1 ratio. These glass frits are available from O. Hommel Co. Other types of glass frits—bismuth lead borosilicate and cadmium bismuth lead borosilicate—are not suitable. Bismuth, and cadmium oxides have been found to be particularly susceptible to reduction under firing in nitrogen atmosphere. The physical characteristics of the preferred glass frits are given in Table A hereinbelow.

The organic vehicle of binder and solvent used in the present invention is conventional and suitably comprises one of a member of organic polymers comprised of an alkyl polymer, such as polymethyl methacrylate and ethylcellulose, mixed with an appropriate drying solvent, such as cellusolve acetate, pine oil or butylcellusolve.

The copper termination paste includes a solids mixture, in the preferred ranges of about 91%–94% free copper powder, 6% to 9% glass frit. A paste is obtained by mixing the solids mixture with a volatile, decomposable organic vehicle, comprising binder and solvent, which is preferably about 15%–30% by weight of the paste mixture. The paste viscosity suitably ranges from 15,000 cps to 25,000 cps.

The above described copper termination paste is conventionally applied to the end portions of ceramic capacitors which have exposed electrode ends, as illustrated in FIG. 1, using conventional dipping equipment. After dipping, the parts are conventionally dried suitably in air, at about 85° C. for about 30 minutes and thereafter, at about 120° C. for about 10 minutes which removes most of the organic solvent but not the organic binder. With drying at higher temperatures in excess of 120° C., the copper film has a tendency to oxidize, producing dark colored copper-terminated parts.

Control of atmosphere and time-temperature exposure following drying and solvent removal and during firing of the capacitor metallization is critical in the present invention to producing a satisfactorily terminated capacitor. During the initial heating or binder "burn out" stage to which the dried capacitor is subjected, suitably from about 300° to 500° C. for about 15 to 30 minutes in a nitrogen atmosphere, the organic binder is essentially eliminated from the copper paste. Decomposition products of the organic constituents of the paste generate gases, e.g. carbon monoxide, which are reducing to the oxides of the ceramic capacitor dielectric. Therefore, in the present invention more than 20 ppm oxygen, suitably from 20 to 200 ppm, and preferably about 50–150 ppm of oxygen is provided in the nitrogen atmosphere during the initial "burn out" stage to protect the ceramic dielectric from chemical reduction of its constituent oxides by the gaseous decomposition products of the organic constituents of the paste. Higher partial pressures of oxygen which lead to oxidation of the copper constituent, resulting in increased resistivity and poor solderability of the fired termination, are to be avoided during the "burn out". At very low oxygen levels, chemical reduction of the oxides of the ceramic dielectric can occur with a decrease in insulation resistance of the terminated capacitor, i.e., the dielectric will become semiconducting, and such low oxygen levels are to be avoided during the "burn out" stage. Heating times during "burn out" will depend upon the thickness of the dried paste since adequate time is required for diffusion of the decomposing organic materials through the copper-glass film; a suitable heating time for this initial "burn out" step is from 15 to 30 minutes with longer times being used with thicker pastes. After binder decomposition and the essential removal of organic material from the paste and the absence thereof in the ambient gaseous environment, sintering of the metal and melting of the glass in paste is thereafter accomplished by continued heating and firing at higher temperatures, e.g. in the range of about 600°–900° C., preferably 650° to 750° C., for about 15 to 70 minutes. During the firing step, if a relatively high oxygen level was used in the initial burn out step, e.g. more than 50 ppm, the oxygen level in the nitrogen atmosphere can be adjusted to a lower value than that of the initial "burn out" stage which is sufficient to prevent chemical reduction of the constituent oxides of the ceramic dielectric but insufficient to cause significant oxidation of the copper. A lower range of oxygen can most often be used in this step, suitably from 30 to 180 ppm and preferably 40 to 80 ppm, and is frequently required, since reducing compounds from the organic binder have been removed in the course of the previous "burn out"; after firing, the gaseous atmosphere used during firing is substantially maintained during cooling of the capacitor body at least down to about 50° C. to avoid the possibility of oxidation of copper. As a general rule, the higher the proportion of organic constituents in the copper containing paste, the higher the amount of oxygen partial pressure employed during "burn out" for a given ceramic dielectric. During the firing step, higher partial pressures are used with ceramic which contains readily reducible oxide constituents such as cadmium oxide, bismuth oxide, lead oxide and the like and lower partial pressures of oxygen with other type ceramic dielectrics such as those containing the oxides of calcium, titanium, zirconium, barium and tantalum.

In the course of the initial "burn out" step, since oxygen is depleted in the gaseous environment due to chemical combination with volatilized organic constituents, it is necessary to provide additional oxygen gas to the extent necessary to maintain the desired partial pressure of oxygen during the initial "burn out" step. This can be accomplished by the addition of replenishing oxygen gas. Alternatively, oxygen partial pressures can be maintained by using known buffer gas mixtures, such as CO, $CO_2$ and $H_2$, $H_2O$. For example, to achieve the equivalent of an oxygen partial pressure of 50 ppm at 700° C. using a $CO_2$, CO mixture a partial pressure ratio $$P_{CO_2}/P_{CO}=3.3\times10^8$$

would be used. With a $H_2O$, $H_2$ mixture to achieve a 50 ppm oxygen partial pressure at 700° C. a partial pressure ratio of $$P_{H_2}/P_{H_2O}=5.5\times10^{-9}$$

would be used.

After the above described treatment, the resulting metallized capacitor may be soldered using conventional soldering techniques. Care should be exercised to preheat the ceramic-copper terminated capacitors in order to avoid thermal shock of the ceramic. If terminated capacitors are to be stored for extended periods of time without a protective covering of solder, the copper should be etched prior to soldering to remove oxide which could degrade solderability.

The present invention is directed to providing copper end terminations on ceramic capacitors, particularly capacitors formed of dielectric ceramic, e.g., barium or neodymium titanates containing up to about 90% of modifiers such as $CaZrO_3$, $BaZrO_3$, $Bi_4Ti_3O_{12}$, $Bi_2O_3$·$ZrO_2$ and the like since these oxide ceramics are ordinarily susceptible to chemical reduction leading to undesired semiconductor properties unless fired in an oxidizing atmosphere.

The glass frit used in the present invention, as noted hereinabove, are cadmium-free and bismuth-free borosilicate glasses.

An actually used and preferred firing profile in accordance with the present invention is shown in FIG. 2. The following Example will further illustrate the present invention.

EXAMPLE I

A copper paste was formulated by admixing glass frit, copper powder, binder and solvent as shown in Table II.

TABLE II

| Copper Paste Formulation | | |
|---|---|---|
| | Composition | Addition (Wt. %) |
| GLASS FRIT | | |
| O'Hommel 3GF-99D | 13.8% $Na_2O$/8.2% $BaF_2$/ 10.9% $BaO$/45.2% $B_2O_3$/ 21.9% $SiO_2$ | 5.25 |
| O'Hommel 3GF-92 | 75.8% $PbO$/13.0% $B_2O_3$ 11.5% $SiO_2$ | 1.75 |
| COPPER POWDER | | |
| Cerac Lot 3151 | metallics 99.8%, 0.8% $O_2$ | 73.0 |
| BINDER | | |
| Union Carbide B-4 | Polymethyl Methacrylate 37% Cellusolve Acetate 63% | 10.0 |
| Solvent | Butyl Cellusolve Acetate | 10.0 |

Fired ceramic multielectrode capacitors of Z7R* (nominal 100 nf), NPO (nominal 10 nf) and Z5U* (nominal 1000 nf) dielectrics were dipped into the copper paste and dried in air at 110°–120° C. for 10–15 minutes. Capacitors from the same group of parts were dipped into a standard silver termination paste, dried at 110°–125° C. for 10–15 minutes and conventionally fired in air for 15 minutes at 820° C. The copper terminated parts were fired in accordance with the present invention in a commercial nitrogen belt kiln built by BTU Engineering of North Billerica, MA. The furnace was constructed with a single, welded muffle heater in six zones-two in the preheat and four in the high firing section. Each end of the furnace muffle was isolated from the external atmosphere by nitrogen curtains: Atmospheres of the preheating and firing sections were separated by a similar nitrogen curtain so that oxygen partial pressures, at different levels, could be maintained during burn-out and firing in accordance with the present invention. A cooling zone was attached to the muffle directly after the high firing section to cool the product before it entered the external atmosphere. FIG. 2 shows the heating cycle used for the copper terminated capacitors in accordance with the present invention. Parts which had been dipped into copper paste and dried as described above were placed on stainless steel wire baskets and loaded onto a belt near the entrance end of the furnace. After firing, following the cycle of FIG. 2 of the capacitor chips were dipped in Tarniban solution (commercial tarnish remover) for 5–10 minutes at about 49° C., rinsed, and a hairpin-type radial lead was attached by spring tension. The leaded parts were then dipped into Alpha 100 flux, removed, and dipped into a 88/10/2 Pb/Sn/Ag solder bath operated at 345° C. The resulting parts, and the silver terminated control group were measured on standard capacitance and resistance bridges for electrical properties. Lead attachment (Peel) strength was measured by bending the leads 90 degrees to an axial configuration, placing the leads in the jaws of a Chatillon force gauge and pulling the leads to failure. Electrical and physical properties of the copper terminated parts and the silver terminated control group are shown in Table B. As can be seen electrical properties of the copper terminated parts in accordance with the present invention are essentially equivalent to the silver terminated control parts and lead attachment strength of the copper terminated parts are consistently higher than the silvered capacitors.

*Electronic Industries Association designation for stable temperature characteristic capacitors.
**Same as Electronic Industries Association COG designation for ultrastable temperature characteristic capacitors.
***Electronic Industries Association designation for general-purpose temperature characteristic capacitors.

A further series of tests involving X7R (nominal 100 nf) and NPO (nominal 100 nf) dielectric ceramic capacitors having the results shown in Tables C and D were performed using the procedure of Example I, except that for the tests of Table C essentially pure nitrogen was used (less than 10 ppm oxygen). The firing time period for the silver paste controls was 10 minutes and the firing temperatures was 825° C.

The tests of Table D, using oxygen in accordance with the present invention, show that the copper termination parts have essentially the same electrical and mechanical properties as the silver termination control parts. The tests of Table C show substantial reduction of insulation resistance for copper terminated parts as compared to silver terminated parts, when oxygen is not used in accordance with the present invention.

In the practice of the present invention, while the use of nitrogen is the preferred gaseous environment, one or more of the inert gases (argon, neon, helium, krypton) may be used in mixtures with nitrogen or in partial or complete substitution therefor and also buffer gas mixtures as previously described.

TABLE A

Characterization of Glass Frits

| Vendor's Name | Particle Size | Softening Point °C. | Surface Area $M^2/g$ | | QUALITATIVE ANALYSIS | | | Glass Type-Composition % | |
|---|---|---|---|---|---|---|---|---|---|
| | | | | | Major | Minor | Trace | | |
| O'Hommel | 1-2 μm | 550° C. | 1.42 | $9.9 \times 10^{-6}$ | Ba | Pb, SN, Zr | Fe, Zn | Sodium Barium Borosilicate | |
| | | | | | | | | $Na_2O$ | 13.8 |
| | | | | | | | | $F_2$ | 8.2 |
| | | | | | | | | BaO | 10.9 |
| | | | | | | | | $B_2O_3$ | 45.2 |
| | | | | | | | | $SiO_2$ | 21.9 |
| O'Hommel | 1-2 μm | 425° C. | 2.17 | $8.8 \times 10^{-6}$ | Pb | | Si, Ti, Fe | Lead Borosilicate | |
| | | | | | | | | PbO | 75-38 |
| | | | | | | | | $B_2O_3$ | 13.05 |
| | | | | | | | | $SiO_2$ | 11.56 |

TABLE B

Properties of Copper Terminated Capacitors in Accordance with Present Invention Compared with Silver Terminated Capacitors

| Ink | Diel. Type | FIRING CONDITIONS Time/Temp/Atmosphere | Capacitance (nF) | Dissipation Factor (df) (%) | Temperature Coeff. cap (%) | | Room Temp. Insulation Resistance (GΩ) | 125° C. Insulation Resistance (GΩ) | Peel Attachment Strength (Lbf) |
|---|---|---|---|---|---|---|---|---|---|
| | | | | | −55° C. | 125° C. | | | |
| Silver | X7R | 15 Min/820° C./Air | 94-119 | 1.2 | −8 | −7 | 110-130 | 3-3.5 | 1.3 |
| Copper | X7R | FIG. 2 | 115 | 1.2 | −8 | −6 | 130 | 2.8 | 1.8 |
| Silver | NPO | 15 Min/820° C./Air | 10.5 | 0 | 14 ppm | 9 | 200 | 5-7 | 1.0 |
| Copper | NPO | FIG. 2 | 10.0 | 0 | 14 | 9 | 200 | 5 | 1.1 |
| | | | | | +10° C. | +85° C. | | | |
| Silver | Z5U | 15 Min/820° C./Air | 1206 | 1.6 | −5 | −58 | 4-10 | 0.9-7 | 0.5 |
| Copper | Z5U | FIG. 2 | 1256 | 1.4 | −7 | −60 | 6-9 | 6-7 | 0.7 |

TABLE C

Effect of Firing in Nitrogen Atmosphere (less than 10 ppm $O_2$)

| Diel. Type | Ink | Cap. nf | D.F. % | % ΔC −55° C. | 125° C. | % VCC −55° C. | 125° C. | IR (GΩ) 25° C. | 125° C. | Peel Test | COMMENTS |
|---|---|---|---|---|---|---|---|---|---|---|---|
| X7R | Copper | 96.0 | 1.1 | −6.2 | −10.5 | −13.0 | −20.2 | 28 | 2 | 0.7-1.4 | Reduced, Dark Color |
| X7R | Copper | 81.4 | 1.3 | −7.1 | −8.6 | −14.7 | −19.9 | 9 | 0.4 | 0.5-1.3 | Reduced, Dark Color |
| X7R | Silver (Control) | 91.7 | 1.07 | −3.3 | −8.8 | −16.0 | −20.0 | 93 | 12 | 1.4-1.6 | Good |
| NPO | Copper | 10.0 | — | 16 ppm | 0 | — | — | 30 | 4 | 0.7-1.4 | Reduced, Dark Color |
| NPO | Copper | 10.1 | — | 12 ppm | 0 | — | — | 30 | 4.5 | 0.7-1.8 | Reduced, Dark Color |
| NPO | Silver (Control) | 10.2 | — | 14 ppm | 2 | — | — | 620 | 7 | 1-1.2 | Good |

TABLE D

Effect of Firing in Nitrogen Using Partial Pressure of Oxygen

| Diel. Type | Ink | Oxygen (ppm) Binder Burnout | Oxygen (ppm) 700° C. | Cap nf | D.F. % | % ΔC −55° C. | 125° C. | % VC −55° C. | 125° C. | IR (GΩ) 25° C. | 125° C. | Peel Test | COMMENTS |
|---|---|---|---|---|---|---|---|---|---|---|---|---|---|
| X7R | Copper | 80-100 | 50-60 | 120 | 1.3 | −8 | −6 | −16 | −18 | 110 | 3 | 1.14 | Good |
| X7R | Copper | 100-150 | 50-60 | 115 | 1.2 | −8 | −6 | −15.5 | −17.8 | 130 | 2.8 | 1.79 | Good |
| X7R | Copper | 80-150 | 50-70 | 118 | 1.1 | −8.5 | −7 | −16 | −18 | 120 | 3 | 1.2 | Good |
| X7R | Silver (Control) | AIR FIRED | | 119 | 1.2 | −8 | −7 | −17 | −20 | 130 | 3 | 1.28 | Good |
| | | | | | | ppm/°C. | | | | | | | |
| NPO | Copper | 80-100 | 50-60 | 10.0 | — | 14 | 9 | 14 | 9 | 200 | 5 | 1.14 | Good |
| NPO | Copper | 100-150 | 50-70 | 10.7 | — | 12 | 12 | 12 | 12 | 190 | 7 | 1.01 | Good |
| NPO | Copper | 100 | 55 | 10.5 | — | 12 | 9 | 12 | 9 | 200 | 7-8 | 1.04 | Good |
| NPO | Silver (Control) | AIR FIRED | | 10.5 | — | 14 | 9 | 14 | 9 | 200 | 5-7 | 1.07 | Good |

We claim:

1. A method for providing a copper metallization end termination on a fired ceramic capacitor having a dielectric formed of barium or neodymium titanates which comprises (i) providing a termination paste consisting essentially of about
(a) 75% to 97% by weight of solids in the paste being finely divided copper particles
(b) 3 to 25% by weight of solids the paste being cadmium-free and bismuth-free glass frit
(c) a volatile and decomposable organic liquid vehicle suspending the solids
(ii) applying the copper containing paste to an electrode exposed end portion of a matured ceramic multielectrode capacitor body having a dielectric formed of barium or neodymium titanates
(iii) heating the copper containing paste-covered end portion of the ceramic capacitor body to a temperature in the range of about 300° to 800° C. in a gaseous environment containing a small amount of oxygen which is in excess of 20 ppm and sufficient to prevent chemical reduction of ceramic during said heating but insufficient to oxidize said copper, the heating initially being at a lower temperature in said range for a period of time sufficient to remove substantially all organic binder and solvent constituents from the applied paste and thereafter being at a higher temperature in said range for a period of time sufficient to sinter the copper constituent of said applied paste and melt the glass constituent of said applied paste and bond the same said ceramic capacitor body.

2. A method in accordance with claim 1 wherein said lower temperature of step (iii) is maintained in the range of about 300° to 600° C. and the oxygen content in the gaseous environment is in the range of about 50 to 150 ppm while said lower temperature is maintained in the range of 300° to 600° C.

3. A method in accordance with claim 1 wherein said higher temperature of step (iii) is maintained in the range of about 600° to 900° C. and the oxygen content in the gaseous environment is in the range of about 40 to 80 ppm while said higher temperature is maintained in the range of 600° to 900° C.

4. A method in accordance with claim 1 wherein said lower temperature of step (iii) is maintained in the range of about 300° to 600° C. and oxygen is added to the gaseous environment to provide an oxygen content therein of about 50 to 150 ppm while said lower temperature is maintained in the range of 300° to 600° C.

5. A method in accordance with claim 1 wherein said gaseous environment is nitrogen.

* * * * *